United States Patent [19]

Promersberger et al.

[11] 4,318,638

[45] Mar. 9, 1982

[54] CABLE DETENSIONING APPARATUS

[75] Inventors: Jon M. Promersberger; Richard W. Steinberg, both of Mankato, Minn.

[73] Assignee: Vibra-King, Inc., Mankato, Minn.

[21] Appl. No.: 114,621

[22] Filed: Jan. 23, 1980

[51] Int. Cl.³ ............................ F16L 1/02; F16L 3/22
[52] U.S. Cl. .................................. 405/177; 405/178
[58] Field of Search ............................... 405/174–183; 242/54 R, 128

[56] References Cited

U.S. PATENT DOCUMENTS

| | | | |
|---|---|---|---|
| 1,800,922 | 4/1931 | Yancey | 242/128 |
| 2,948,483 | 8/1960 | Petersen | 242/54 R |
| 3,269,672 | 8/1966 | Steinback | 242/128 |
| 3,317,149 | 5/1967 | Gooch | 242/54 R |
| 3,407,852 | 10/1968 | Lang | 140/147 |
| 3,429,134 | 2/1969 | Coffey | 405/177 X |
| 3,469,801 | 9/1969 | Hauck et al. | 242/54 |
| 3,484,054 | 12/1969 | Waywell et al. | 242/128 |
| 3,717,313 | 2/1973 | Williams | 242/54 R |
| 3,802,210 | 4/1974 | D'Andrea | 405/178 |
| 3,822,834 | 7/1974 | Fjarlie | 242/54 R |
| 3,851,489 | 12/1974 | Richardson | 405/178 |
| 3,941,324 | 3/1976 | Green | 242/54 R |

*Primary Examiner*—Dennis L. Taylor
*Attorney, Agent, or Firm*—Burd, Bartz & Gutenkauf

[57] ABSTRACT

A buried cable laying apparatus to lay a cable in an open trench in the ground in a relaxed or tension-free state. The apparatus progressively forms a trench and then buries detensioning line and a cable in the trench. The detensioning line is in tension and the cable is in a relaxed state. The detensioning line and the cable are both unreeled from drums moving at the same rotational speed. The drum of the detensioning line is of a smaller diameter than the drum of the cable whereby the detensioning line drum will feed more cable than is required but slip relative to the cable until the cable gets tight.

25 Claims, 5 Drawing Figures

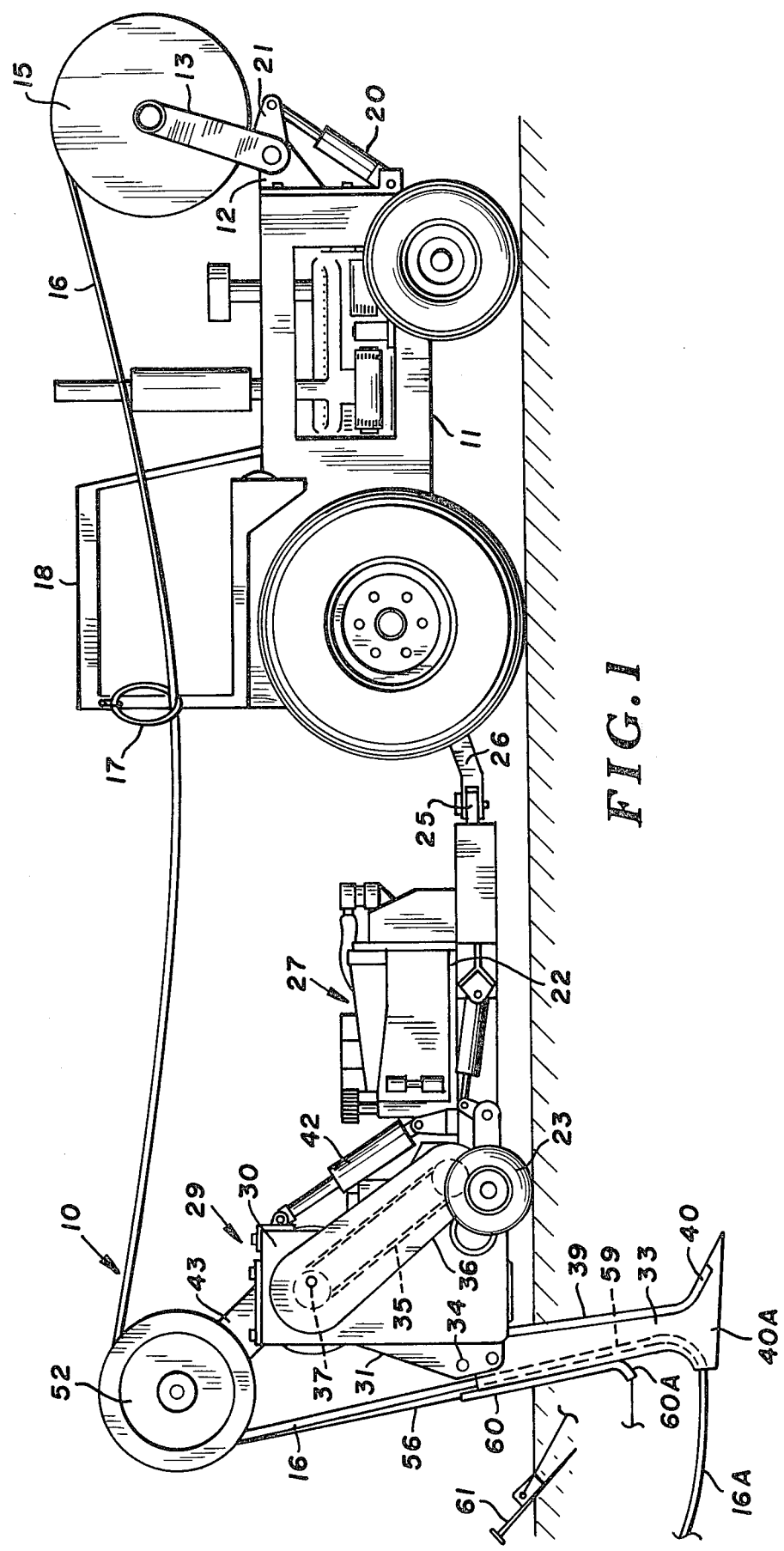

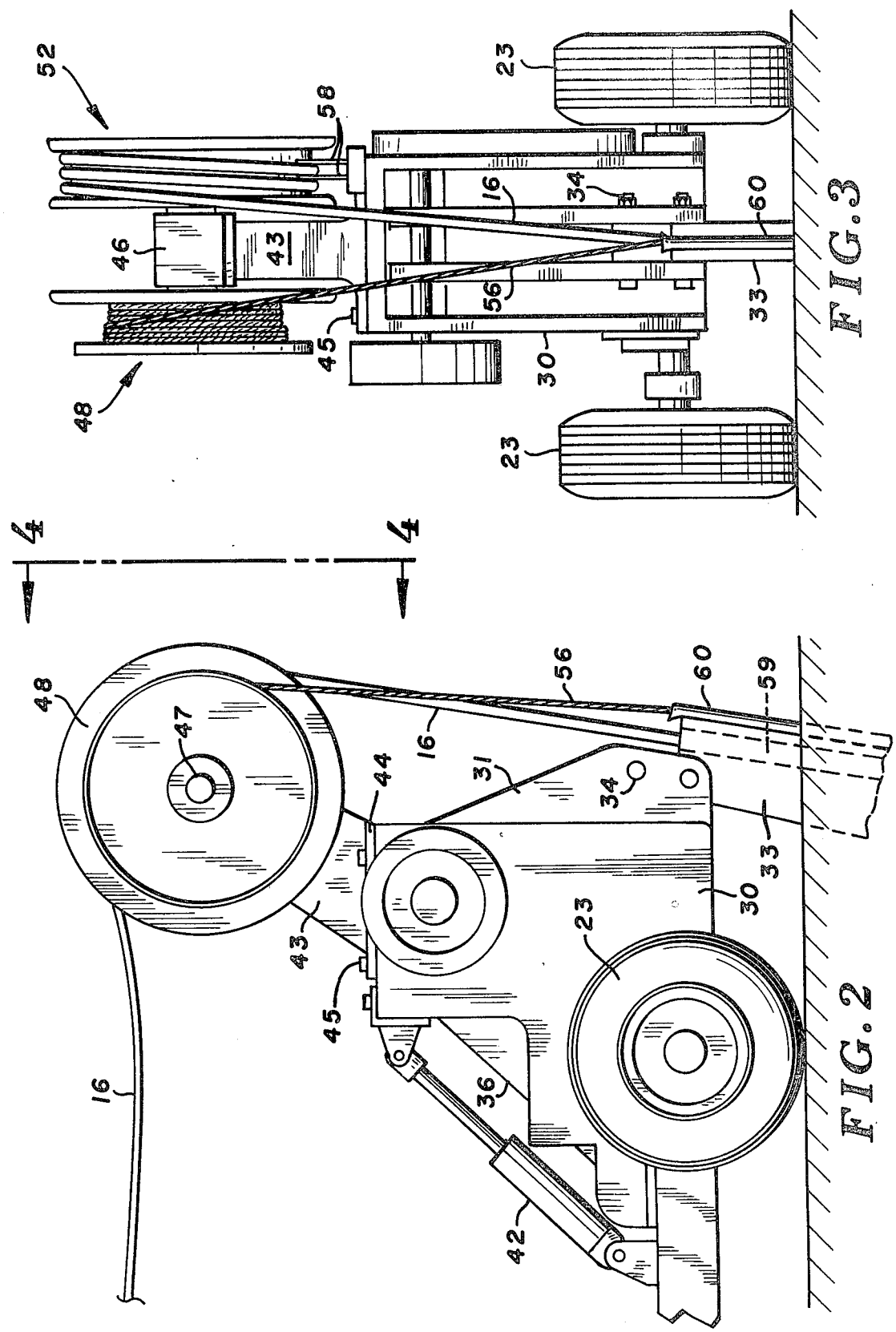

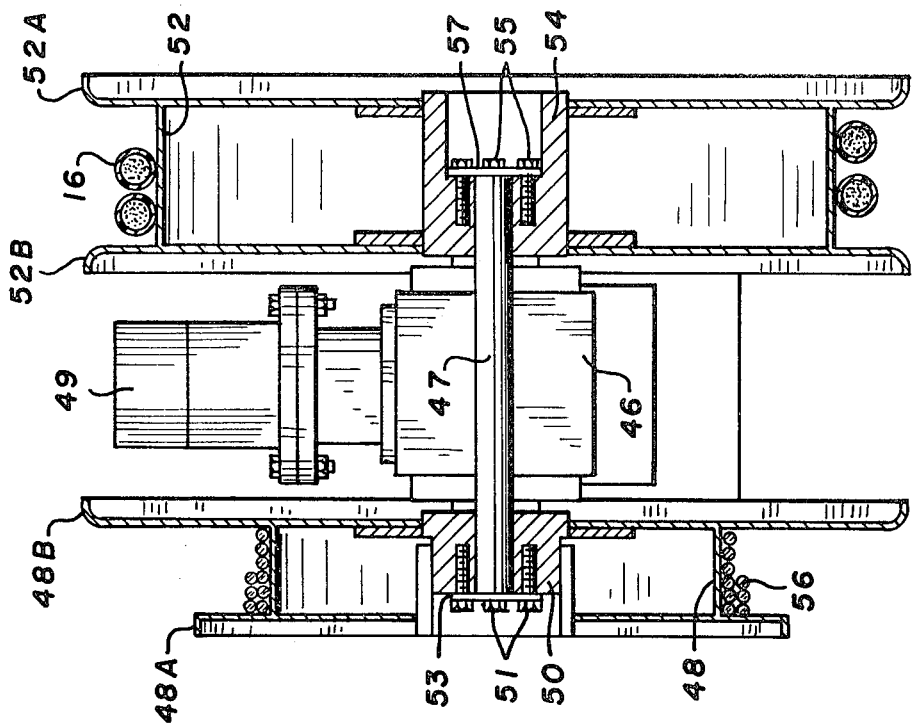
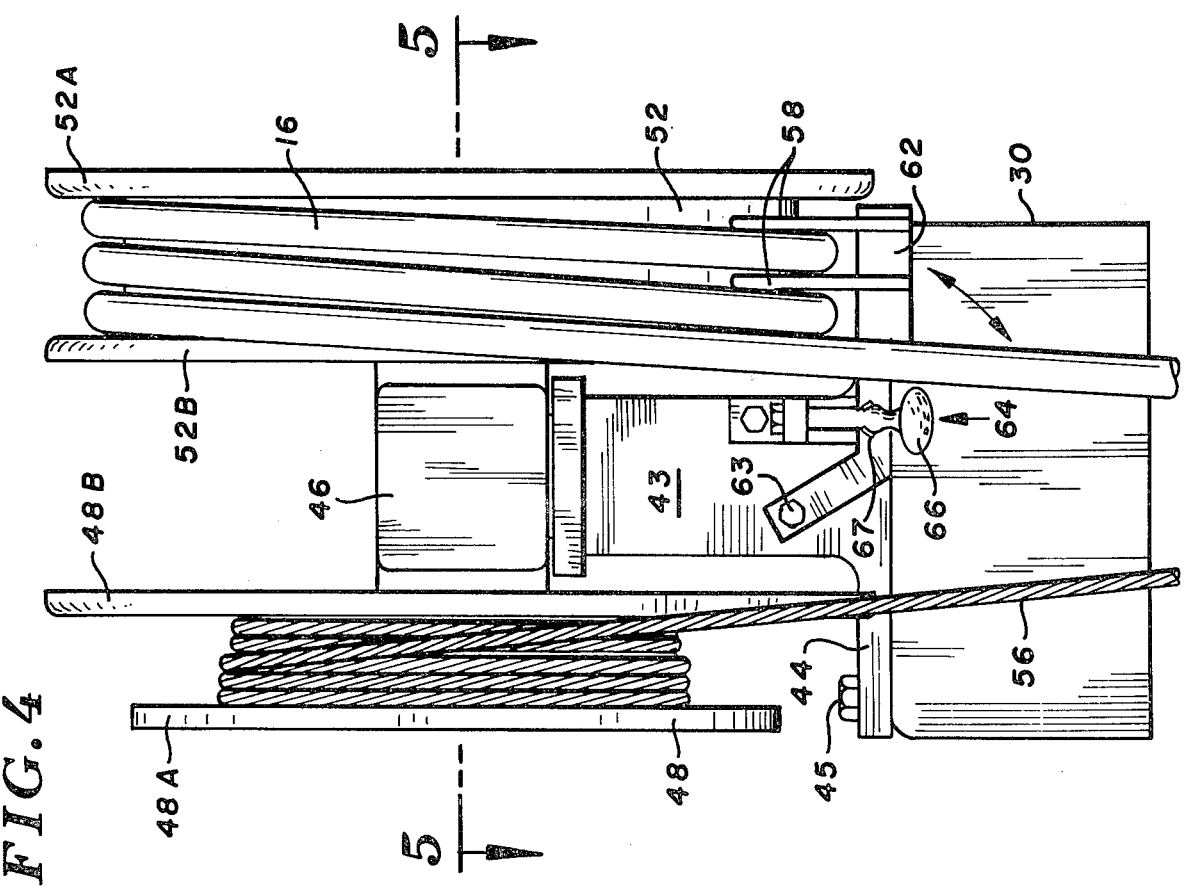

CABLE DETENSIONING APPARATUS

SUMMARY OF THE INVENTION

Numerous cable laying devices are available for laying underground cable, such as electrical or communication cable. The device simultaneously digs a narrow trench in the ground and feeds the cable into the trench. The trench closes as the device passes over it. The devices commonly include a plow having a plowshare which oscillates in the ground to progressively form the trench. A cable supply chute is located along the rear edge of the plow share and directs cable from a cable supply reel into the trench. The cable is pulled off of the supply reel against the friction of the reel mount and is layed in the ground under tension. It is desirable to lay the cable in the open trench in a relaxed state so as to leave the cable less vulnerable to the vagaries of weather and environment, and so as not to distort it.

The present invention relates to a buried cable laying apparatus and in particular to a cable feed mechanism to lay cable in an open trench in the ground in a relaxed or tension-free state. The mechanism includes a capstan drum which receives and accommodates several wraps of cable from the cable supply reel. The cable travels from the capstan drum through a delivery chute located on the back of the plowshare, and into the open trench just formed by the plow. A detensioning line drum carries a detensioning line and is fixed for rotation with the capstan drum. The detensioning line is plowed into the ground at a depth so to be located above the cable. The diameter of the capstan drum is larger than the diameter of the detensioning line drum such that the length of cable reeled off the capstan drum per revolution is greater than the length of the detensioning line reeled off of the detensioning line drum for the same revolution. The capstan drum is rotated upon rotation of the detensioning line drum with the consequence that the detensioning line is plowed into the ground under tension, but the cable is layed in the trench in a relaxed or tension-free state.

IN THE DRAWINGS:

FIG. 1 is a side elevational view of a buried cable laying apparatus according to the invention under tow by a prime mover;

FIG. 2 is an enlarged fragmentary side elevational view of the buried cable laying apparatus of FIG. 1 showing the opposite side thereof;

FIG. 3 is a rear elevational view of the buried cable laying apparatus of FIG. 2;

FIG. 4 is an enlarged rear elevational view of a portion of the buried cable laying apparatus of FIG. 2 taken along the line 4—4 thereof; and FIG. 5 is a sectional view of the portion of the buried cable laying apparatus shown in FIG. 4 taken along the line 5—5 thereof.

DESCRIPTION OF PREFERRED EMBODIMENT:

Referring to the drawings, there is shown in FIG. 1 a buried cable laying apparatus 10 in tow behind a prime mover constituted as a tractor 11. Tractor 11 has a forward bracket 12 which carries a supply reel arm 13. Rotatably assembled to the arm 13 is a standard cable supply reel 15 carrying a cable 16. Cable 16 travels from reel 15 rearwardly through an intermediate support loop 17 attached to the cab 18 of tractor 11 a back to the buried cable laying apparatus 10. A hydraulic motor 20 is fastened at one end to the forward end of tractor 11 and at the opposite end to a second arm 21 integrally secured with respect to the supply reel arm 13. Supply reel 15 is raised and lowered by hydraulic motor 20 for loading and unloading. Cable 16 travels rearwardly to the buried cable laying apparatus 10 and is laid in the ground in a relaxed or tension-free state so as to be less vulnerable to vagaries of the weather and environment and not be prone to be distorted. Cable 16 can be telephone cable, power cable, television cable or like cable to be buried.

Buried cable laying apparatus 10 includes a standard frame 22 supported toward the rearward end by a pair of wheels 23. The forward end of frame 22 has a coupling 25 for connection to the tractor hitch 26 for towing. An internal combustion engine 27 is mounted on the forward end of frame 22, and a plow assembly 29 is mounted on the rearward end of frame 22.

Plow assembly 29 includes a plow housing 30 mounted on the rear of frame 22. A plow lift frame 31 is reciprocally mounted in housing 30 and has a lower end extending outward over the rear edge of frame 22. The upper end of a relatively narrow plowshare 33 is connected by bolts 34 to the lower end of plow lift frame 31. Internal combustion engine 27 is connected through a suitable transmission (not shown) to plow lift frame 31 by a drive belt 35 housed in drive belt housing 36. Drive belt 35 is connected to the plow lift frame 31 by an eccentric connection indicated at 37. Operation of internal combustion engine 37 results in eccentric reciprocal movement of the plow lift frame 31 and the plowshare 33. Plowshare 33 has a forward cutting blade 39 and a lower foot 40 which progressively form a trench for laying cable upon eccentric movement of the lift frame 31 and forward movement of tractor 11 in the usual fashion. A hydraulic piston-cylinder assembly 42 is connected between the frame 22 and the upper end of the plow lift frame 31 in order to permit adjustment of the position of the plowshare 33.

A drum mount arm 43 has a lower horizontal flange 44 fastened to the top of plow housing 30 by bolts 45. Arm 43 extends upward and rearward therefrom from the top of plow housing 30. As shown in FIGS. 4 and 5, the upper end of arm 43 carries a bearing assembly 46. A transverse, horizontal link shaft 47 is carried by bearing assembly 46 and has arms extending outward from either side of the bearing assembly. A detensioning line drum 48 is assembled to one end of link shaft 47. Detensioning line drum 48 has a central drum block 50 secured to the end of link shaft 47. Bolts 51 are secured to the end of the link shaft 47 and pass through plate 53 into the central drum block 50 to secure the detensioning line drum 48 on the end of the link shaft 47. A capstan drum 52 is assembled to the opposite end of link shaft 47 for common rotation with detensioning line drum 48. Capstan drum 52 has a central drum block 54 with an opening accommodating the end of link shaft 47. Bolts 55 are threaded into the end of link shaft 47 and are threaded through a plate 57 and into the drum block 54 to securely fix the capstan drum 52 on the opposite end of link shaft 47.

A supply of detensioning line 56 is coiled about the detensioning line drum 48 constrained thereon by drum side plates 48A, 48B. Detensioning line 56 can be aircraft cable, wire, rope or the like. A hydraulic motor 49 can be provided for winding detensioning line 56 on drum 48.

Cable 16 traveling from supply reel 15 is wrapped several times around capstan drum 52 and extends downwardly therefrom. Parallel, spaced apart fingers 58 can be provided to maintain spacing between the wraps of cable 16 around capstan drum 52. Fingers 58 are mounted on a horizontal bar 62 pivoted to drum arm 43 as at 63 so that fingers 58 can be rotated to an out of the way position. A locking element or releasable holder 64 normally holds bar 62 in position and includes a flexible element 66 fixed at one end to drum arm 43 and having an enlarged end portion releasably engaging a clip assembly 67 on bar 62. Drum side plates 52A, 52B maintain the windings of cable 16 on the drum 52. Capstan drum 52 is constrained to rotate with the detensioning line drum 48. The diameter of detensioning line drum 48 is less than the diameter of capstan drum 52 such that for each revolution of the detensioning line drum 48 and the corresponding revolution of capstan drum 52, the length of cable 16 unreeled from the capstan drum 52 is greater than the corresponding length of detensioning line 56 unreeled from the detensioning line drum 48.

A generally vertical, channel-shaped cable burial chute 59 is formed in the rear vertical portion of plowshare 33. Chute 59 has an inlet opening at the top of plowshare 33 and an outlet opening at a rearward extension 40A of foot 40 for delivery of cable behind plowshare 33. Cable 16, extending from capstan drum 52, travels through the cable burial chute 59 to be layed at the bottom of the trench progressively formed by the plowshare 33. A detensioning line burial chute 60 is fastened to the rear of plowshare 33. Detensioning line burial chute 60 has an inlet opening just above the inlet opening to the cable burial chute 59 and an outlet 60A located somewhat above the outlet of the cable burial chute. Detensioning line 56 extends from detensioning line drum 48 and travels through the detensioning line burial chute 60 and out of the outlet 60A to be buried at a location above the cable 16.

In use, tractor 11 is operated to tow the buried cable laying apparatus 10. Internal combustion engine 27 operates to drive the drive belt 35 and eccentric connection 37. Plow lift frame 31 is eccentrically oscillated, as is plowshare 33, to progressively form a trench in the ground. The end of detensioning line 56 is suitably fastened to the ground as being secured to the stake 61 shown in FIG. 1. As apparatus 10 moves over the ground forming a trench, detensioning line 56 is fed from detensioning line drum 48 through the detensioning line chute 60 and out of the chute outlet 60A where it is laid in the trench in tension. Cable 16 is reeled off of the supply reel 15, passes over the capstan drum 52 and down through the cable burial chute 59 to a location where it is also laid in the trench. Rotation of the detensioning line drum 48 causes direct corresponding rotation of the capstan drum 52. Since the diameter of the detensioning line drum 48 is smaller than that of the capstan drum 52, the length of the cable 16 buried in the trench for each revolution is greater than the length of detensioning line 56 buried in the trench. The cable 16 is laid in the trench in a relaxed or tension-free state. Once the frame 22 has passed, the trench closes on itself. The detensioning line 56 can be left in the ground in order to mark the location of the cable 16.

While there has been shown and described a preferred embodiment of the cable laying apparatus, it is understood that changes in the cable handling apparatus and trenching machine can be made by those skilled in the art without departing from the invention. The invention is defined in the following claims.

The embodiments of the invention in which an exclusive property or privilege is claimed are defined as follows:

1. An apparatus to lay and bury a cable in a relaxed state in a progressively formed trench in the ground, comprising: a frame movable over the ground; a plowshare mounted on the frame in position to progressively form a trench in the ground as the frame is moved over the ground; a capstan drum rotatably mounted on the frame adapted to receive at least one wrap of cable from a cable supply source and direct it to the progressively formed trench for burial therein; a detensioning line drum rotatably mounted on the frame adapted to carry a supply of detensioning line and rotatable to deliver detensioning line to the progressively formed trench; and means connecting the capstan drum to the detensioning line drum for rotation of the capstan drum upon rotation of the detensioning line drum whereby upon rotation of the detensioning line drum the length of cable delivered to the progressively formed trench is greater than the length of detensioning line delivered to the progressively formed trench.

2. The apparatus of claim 1 wherein: the detensioning line drum and the capstan drum are connected for common rotation, and the diameter of the capstan drum is greater than the diameter of the detensioning line drum.

3. The apparatus of claim 2 wherein: said plowshare includes a cable burial chute to guide the cable into the progressively formed trench.

4. The apparatus of claim 2 including: a detensioning line burial chute fastened to the plowshare to guide the detensioning line into the progressively formed trench and positioned to locate the detensioning line above the cable in the trench.

5. The apparatus of claim 4 including: a plow housing mounted on the frame, a plow lift frame reciprocally mounted in the plow housing, said plowshare being connected to the plow lift frame, and means for reciprocation of the plow lift frame.

6. The apparatus of claim 5 including: an arm fastened to the plow housing and extending upward and rearward therefrom; a horizontal link shaft rotatably assembled to the upward and rearward end of the arm, said capstan drum being secured to one end of the link shaft, said detensioning line drum being secured to the other end of the link shaft.

7. The apparatus of claim 6 including: an internal combustion engine mounted on the frame, eccentric means connecting the internal combustion engine to the plow lift frame for reciprocation of the plow lift frame.

8. The apparatus of claim 1 including: means operably connected to the detensioning line drum to power rotate the detensioning line drum to wind the detensioning line on said detensioning line drum.

9. The apparatus of claim 1 wherein: the means connecting the capstan drum to the detensioning line drum include mount means having a shaft, first means connecting the capstan drum to the shaft, and second means connecting the detensioning line drum to the shaft.

10. The apparatus of claim 9 wherein: the capstan drum has a diameter greater than the diameter of the detensioning line drum.

11. The apparatus of claim 9 including: means operably connected to the detensioning line drum to power rotate the detensioning line drum to wind the detensioning line on said detensioning line drum.

12. The apparatus of claim 11 wherein: the means operably connected to the detensioning line drum include motor means mounted on the mount means between the capstan drum and the detensioning line drum.

13. A cable delivery apparatus for delivery of cable to lay in a trench in a tension-free state, comprising: a frame movable over the ground; a capstan drum rotatably mounted on the frame adapted to receive at least one wrap of cable from a cable supply source and direct it into the trench; a detensioning line drum rotatably mounted on the frame adapted to carry a supply of detensioning line and rotatable to deliver detensioning line to the trench; and means connecting said capstan drum and said detensioning line drum for common rotation, and the capstan drum having a diameter greater than the diameter of the detensioning line drum whereby upon rotation of the detensioning line drum the length of cable delivered to the trench is greater than the length of detensioning line delivered to the trench.

14. The apparatus of claim 13 including: a plowshare mounted on the frame to progressively form the trench.

15. The apparatus of claim 14 including: coupling means on the frame to couple the frame to a prime mover.

16. The apparatus of claim 15 wherein: said capstan drum is adapted to receive cable traveling from a cable supply reel mounted on a prime mover coupled to the frame.

17. The apparatus of claim 13 wherein: the detensioning line drum and the capstan drum are connected to a common power transmitting means.

18. The apparatus of claim 13 including: a plowshare adapted to extend into the ground mounted on the frame to progressively form a trench for receiving the cable and its detensioning line, and detensioning line burial chute means connected to the plowshare to guide the detensioning line into the progressively formed trench and locate the detensioning line above the cable in the trench.

19. The apparatus of claim 13 wherein: the means connecting said capstan drum and said detensioning drum have an arm fastened to said frame and extended upwardly therefrom, a horizontal link shaft rotatably mounted on said arm, first means securing the capstan drum to one end of the link shaft, and second means securing the detensioning line drum to the other end of the link shaft.

20. The apparatus of claim 13 including: means operably connected to the detensioning line drum to power rotate the detensioning line drum to wind the detensioning line on said detensioning line drum.

21. The apparatus of claim 13 wherein: means connecting said capstan drum and said detensioning line drum include mount means having a shaft, first means connecting the capstan drum to the shaft, and second means connecting the detensioning line drum to the shaft.

22. The apparatus of claim 21 including: means operably connected to the detensioning line drum to power rotate the detensioning line drum to wind the detensioning line on said detensioning line drum.

23. The apparatus of claim 22 wherein: the means operably connected to the detensioning line drum include motor means mounted on the mount means between the capstan drum and the detensioning line drum.

24. A method of laying a cable in a trench in a tension-free state, comprising the steps of: providing a first rotatable drum having a supply of detensioning line; providing a second rotatable drum having a larger diameter than the first drum and having at least one wrap of cable traveling from a cable supply source; and unreeling both drums simultaneously at the same rotational speed with the detensioning line in tension and with the detensioning line and the cable directed to the trench whereby the detensioning line enters the trench under tension and the cable enters the trench in a tension-free state.

25. The method of claim 24 including: progressively forming a trench ahead of the location where the cable and the detensioning line enter the trench.

* * * * *